Inventor
ALAN MOORE

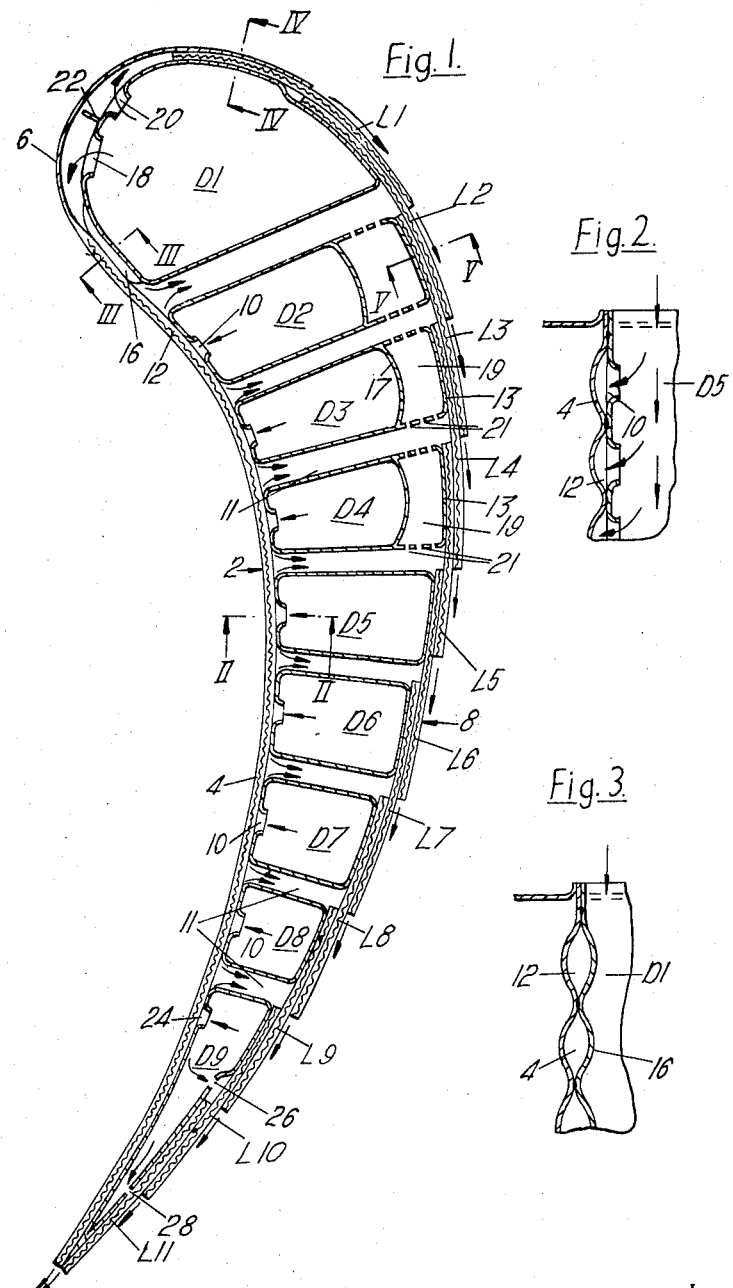

By Bailey, Stephens
& Huettig
Attorneys

3,246,469
COOLING OF AEROFOIL MEMBERS
Alan Moore, Bristol, England, assignor to Bristol Siddeley Engines Limited, Bristol, England, a British company
Filed Aug. 17, 1964, Ser. No. 390,093
Claims priority, application Great Britain, Aug. 22, 1963, 33,318/63
9 Claims. (Cl. 60—35.55)

This invention relates to aerofoil members for the deflection of hot gases. The object is to provide cooling distributed over the pressure surface and the suction surface of the member.

An aerofoil member according to the preesnt invention comprises: a pressure-side skin and a suction-side skin; a series of conduits within the member extending span-wise and distributed chord-wise and arranged to receive coolant fluid at at least one end, each conduit having outlet opening means for discharging at least most of the coolant fluid in a jet-like manner against the adjacent inner surface of the pressure-side skin; and means for transferring the coolant fluid from the pressure side of the member to the suction side of the member, between the conduits, and for discharging the coolant fluid rearwards through a plurality of openings to form a film over the outside of the suction-side skin.

Preferably the conduits are in the form of individual ducts, each defined by a surrounding wall, each duct being spaced apart from adjacent ducts.

According to a feature of the invention, the pressure-side skin of the member is corrugated, and the passages formed between the corrugations and the adjacent walls of the conduits carry the cooling fluid forwards and rearwards.

Preferably the suction surface of the blade comprises a series of overlapping corrugated louvre sheets defining rearwardly-directed passages which discharge the cooling fluid.

The accompanying drawings show one example of an aerofoil member according to this invention. In these drawings:

FIGURE 1 is a cross section of the member;
FIGURES 2, 3, 4 and 5 are enlarged detailed transverse sections of the member in planes II—II, III—III, IV—IV and V—V in FIGURE 1;
FIGURE 6 is a fragmentary perspective view of the member to show its internal structure; and,
FIGURE 7 illustrates part of a gas turbine engine for aircraft propulsion in which aerofoil members according to the invention may be used.

Figure 7:
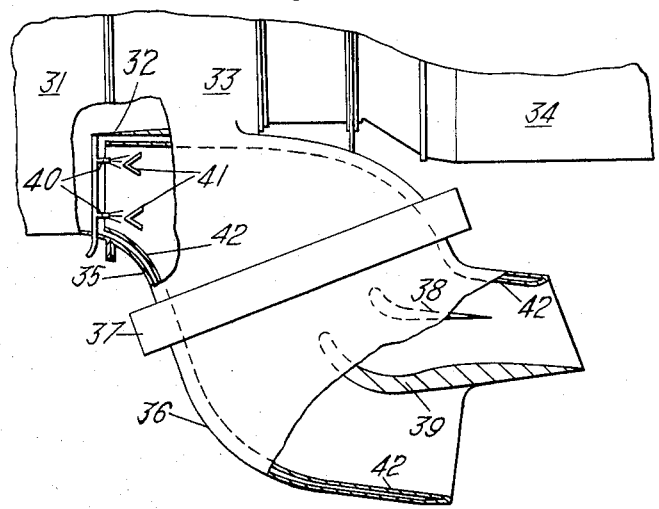

The engine of which part is shown in FIGURE 7 comprises a low pressure compressor 31 the outlet of which is divided by an annular partition 32. The air discharged within the partition passes through a high pressure compressor 33, and combustion equipment 34 and then drives high pressure and low pressure turbines, not shown, which are respectively coupled to the high pressure and low pressure compressors. The air discharged outside the partition 32 flows through a pair of stub ducts 35 on opposite sides of the engine, on each of which a swivelling elbow nozzle 36 is mounted by means of a bearing assembly 37. Each nozzle has two guide vanes 38 and 39 of aerofoil section to assist deflection of the efflux round the elbow bend, and means represented as injectors 40 and flame holders 41 are provided in the stub ducts for burning additional fuel in the air flowing to the nozzles so as to produce more thrust. To avoid overheating of the walls of the stub ducts and nozzles, and the bearing assembly 37, a liner 42 is provided spaced from the walls. Cool air flows through the space between the liner and the walls, from inlets from the low pressure compressor upstream of the flame holders, and is discharged through openings in the walls of the vanes 38 and 39 as presently described.

The requirements for vanes 38 and 39 in such a situation are: thorough cooling, sheet metal construction to minimise weight, and economical use of cooling air, preferably at a low pressure so as to avoid power losses which would be caused by compressing the air to a substantially higher pressure than that of the fluid deflected by the vane. It is important therefore to keep the pressure losses in the system low and to use the cooling air to the best advantage.

The application of film cooling to the suction side only is allied with the fact that jet cooling is confined to the pressure side. The reason for this arrangement is to cut down on the amount of air to be tapped from the compressed air at the L. P. compressor stage of the engine. It is more desirable to jet cool the pressure side as the pressure is greater on this side of the blade than on the suction side and more economical to discharge the same air at lower pressure at the suction surface of the blade. There may also be aerodynamic advantage in discharging the cooling air over the suction side of the blade since it adds energy to the boundary layer and helps to prevent separation of the streamlines from the blade profile.

The vane illustrated in FIGURES 1 to 6 has a pressure surface 2 formed by a skin 4 which is corrugated, with the crests of the corrugations running chordwise. The skin 4 has a prolongation 6 which extends round the leading edge of the vane and may be plain, as shown, or corrugated. On the suction surface 8, the skin is made up of a series of overlapping corrugated sheets LI–LII constituting louvres. In FIGURE 1 these corrugated sheets are "cross-hatched" with an undulated line for convenience of identification, but it must be understood that the corrugations in fact extend in planes parallel to the paper.

Within the vane are a series of ducts D1–D9, defining conduits which extend in the span-wise direction and which are distributed in the chord-wise direction. The front and rear duct walls are spaced from the corresponding walls of adjacent ducts, so that there are slit-like through passages 11 from the pressure side of the vane to the suction side.

The vane extends completely across the nozzle in which it is used, and the interiors of the ducts are connected at both ends of the vane to the space between the nozzle wall and the liner 42, through which there is a flow of cool air from the low pressure compressor at a slightly higher pressure than that of the products of combustion deflected by the vane. All the air from each of the ducts D2–D8 emerges through a row of slot-shaped outlet openings 10 (see FIGURE 1). The valleys of the pressure-side skin 4 are welded to the adjacent walls of the ducts, leaving lengths of chord-wise passage 12 defined between the ducts and the crests of the corrugations. One of the openings 10 is aligned with each passage 12. The air emerging from each opening impinges as a jet against the inner surface of the skin 4, and then flows forward and rearward to the adjacent through passages 11. The jet-like impingement causes particularly efficient heat exchange between the skin and air. (The foremost duct D1 and the rearmost duct D9 are differently constructed, as described below, and exhibit the features of the invention in modified form.)

The louvre sheets L3–L9 are associated with the ducts D2–D8. Where the louvre sheets overlap, the crests of the inner sheet are in register with the valleys of the outer sheet, as is apparent from FIGURES 5 and 6, and where the sheets touch one another, they are welded together as indicated at C1, C2 etc. in FIGURE 6. The suction-side wall 13 of each of the ducts D2–D8 is corrugated to fit the corrugations of the adjacent louvre sheet and is welded to it. Each through passage 11 between the ducts thus leads to a row of rearwardly-extending passages 14 through which the air passes for a distance equal to the width of one duct, to emerge over the outer surface of the inner louvre sheet, that is to say over the suction surface of the vane, and form a film which acts as a heat barrier protecting the vane from the flow of heated air through the nozzle in which the vane is installed.

The duct D1, adjacent to the leading edge of the vane, has a corrugated wall portion 16 attached to the pressure-side skin 4. On the suction side, a plain wall portion of the duct D1 is attached to louvre sheet L1 and a corrugated portion conforms with and is attached to louvre sheet L2. The curved prolongation 6 of the skin 4 is attached to the outside of the louvre sheet L1, and thus is held spaced from the curved front wall of the duct D1. Air is discharged obliquely forwards from the duct D1 through two rows of openings 18 and 20. A flange 22 prevents more than a small amount of mixing between the flows out of the two rows of openings and permits the pressure drop across the openings 20 to be somewhat greater than that across the openings 18. Air from the openings 18 passes to the through passage 11 between the ducts D1 and D2. Air from the openings 20 passes to the louvres L1 and L2.

Figure 4:
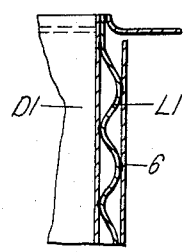
Figure 5:
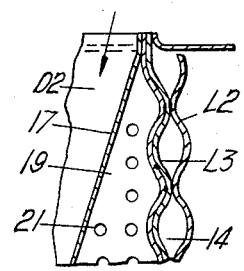
Figure 6:
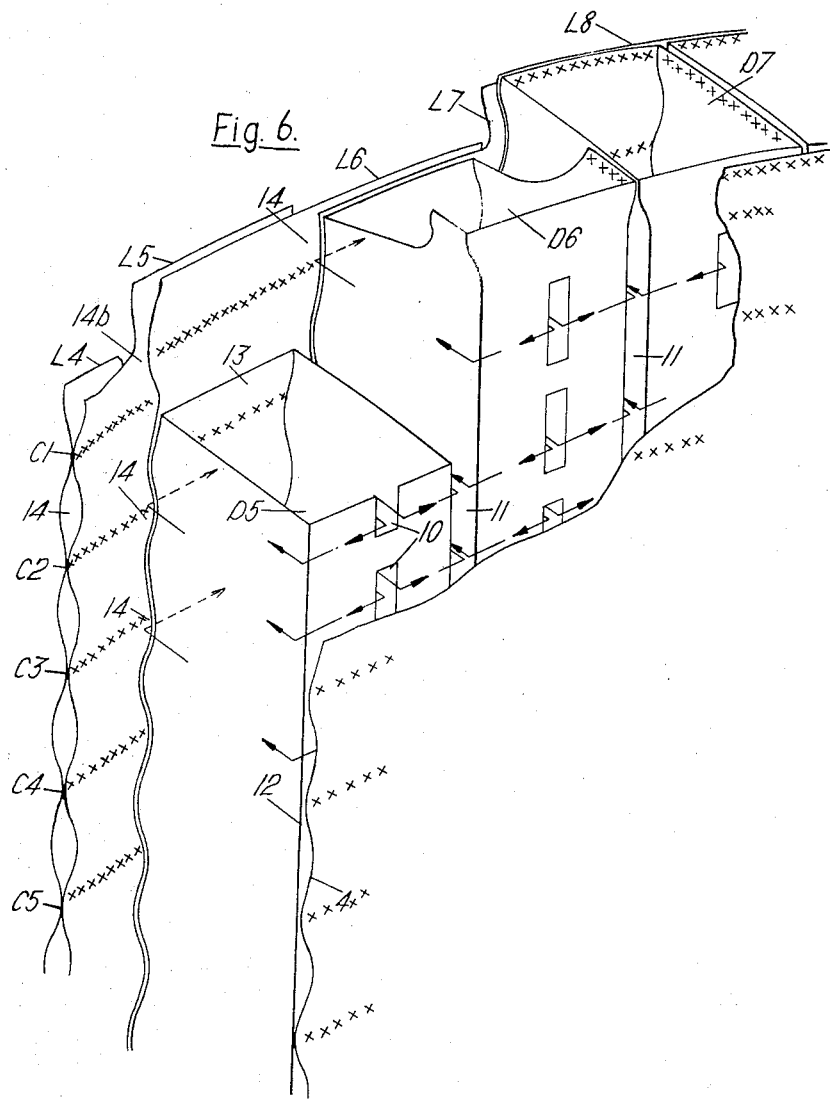

The ducts D2–D8 all have the same construction except for D2, D3, and D4, each of which has a partition 17, which (as shown in FIGURES 1 and 5) extends obliquely to the length of the duct, from each end, and thus reduces the cross sectional area of the ducts as the cooling air approaches the middle of the vane. The space 19 on the convex side of each partition is ventilated by perforating the side walls of the duct at 21 so that these spaces 19 in effect provide one relatively large chamber which supplies the louvres L3–L6 with cooling fluid. The purpose of this chamber is to allow flow and pressure equalisation over this area of the suction side. This is necessary because a larger volume of cooling fluid is ejected from duct D1 through the openings 18, than from the openings 10 in each of the ducts D2–D8. Alternatively the suction-side walls of some or all of the ducts D2–D8 may be plain so as to form corrugation passages for flow equalisation between adjacent passages 11.

The duct D9 has three rows of outlets, one row 24 on the pressure side of the vane to supply coolant forwards and rearwards, the portion which flows rearwards being discharged through the trailing edge of the vane, and the other two rows 26 and 28 supplying coolant to louvres L10 and L11, the suction side wall of the duct being corrugated to fit the adjacent louvre sheet corrugations except in the region from the openings 28 to the trailing edge.

Examples of other situations in which aerofoil members according to this invention may be used include: deflector vanes in thrust reversers, and in hot gas conduits of various kinds, and stator blades or inlet guide vanes for large gas turbines. If a member according to the present invention is a short vane or blade, it will suffice to supply coolant fluid from one end only.

In place of ducts with individual walls, the conduits in a member according to the present invention may be in the form of bores in a solid member, the through passages then being constituted by rows of further bores passing between the conduits. The pressure and suction side walls may be plain instead of corrugated, being spaced from overlapping walls parts by spacing pieces, ribs or sinuous strips.

I claim:
1. An aerofoil member for the deflection of hot gas, comprising: a pressure-side skin and a suction-side skin; a series of conduits within the member extending spanwise and distributed chord-wise and arranged to receive coolant fluid at at least one end, each conduit having outlet opening means for discharging at least most of the coolant fluid in a jet-like manner against the adjacent inner surface of the pressure-side skin; and means for transferring the coolant fluid from the pressure side of the member to the suction side of the member, between the conduits, and for discharging the coolant fluid rearwards through a plurality of openings to form a film over the outside of the suction-side skin.

2. A member according to claim 1, in which the conduits are in the form of individual ducts, each defined by a surrounding wall, each duct being spaced apart from adjacent ducts.

3. A member according to claim 2, in which the pressure-side skin of the member is corrugated, and passages formed between the corrugations and the adjacent walls of the conduits carry the cooling fluid forwards and rearwards.

4. A member according to claim 2, including a foremost duct having two opening means arranged to discharge coolant fluid obliquely forwards, to flow respectively in contact with the pressure-side skin and the suction-side skin of the member.

5. A member according to claim 2, including a rearmost duct having opening means directed towards the pressure-side skin of the member and further opening means directed towards the suction-side skin of the member.

6. A member according to claim 1, in which the suction surface of the blade comprises a series of overlapping corrugated louvre sheets defining rearwardly-directed passages which discharge the cooling fluid.

7. A member according to claim 1, in which each opening means is a row of slot-shaped openings.

8. An aircraft power plant including an outlet duct, an elbow nozzle forming a swivelling termination to the outlet duct, and at least one aerofoil member according to claim 1 mounted within the elbow nozzle.

9. An aircraft power plant according to claim 8, including a compressor, a connection for an air flow from the compressor through the outlet duct, means for burning fuel in the air flow, a liner in the duct, the interiors of the conduits of the aerofoil member being in communication with the space defined between the liner and an outer wall of the duct, and a connection for a coolant air flow from the compressor into this space and thence to the conduits of the aerofoil member.

References Cited by the Examiner

UNITED STATES PATENTS

| | | | |
|---|---|---|---|
| 2,489,683 | 11/1949 | Stalker | 230—122 |
| 2,514,105 | 7/1950 | Thomas | 230—132 |
| 2,959,377 | 11/1960 | Kaplan | 244—117.1 |
| 3,153,906 | 10/1964 | Marchant | 60—35.55 |

MARK NEWMAN, *Primary Examiner.*